US011306663B2

United States Patent
Petersen et al.

(10) Patent No.: US 11,306,663 B2
(45) Date of Patent: Apr. 19, 2022

(54) GAS TURBINE ENGINE

(71) Applicant: Rolls-Royce Deutschland Ltd & Co KG, Blankenfelde-Mahlow (DE)

(72) Inventors: Björn Petersen, Berlin (DE); Philip Brian Walker, Teltow (DE)

(73) Assignee: Rolls-Royce Deutschland Ltd & KG, Blankenfelde-Mahlow (DE)

( * ) Notice: Subject to any disclaimer, the term of this patent is extended or adjusted under 35 U.S.C. 154(b) by 99 days.

(21) Appl. No.: 16/716,068

(22) Filed: Dec. 16, 2019

(65) Prior Publication Data

US 2020/0191063 A1    Jun. 18, 2020

(30) Foreign Application Priority Data

Dec. 18, 2018 (DE) ...................... 10 2018 132 675.0

(51) Int. Cl.
| | |
|---|---|
| *F02C 7/36* | (2006.01) |
| *F02C 7/06* | (2006.01) |
| *F16H 57/00* | (2012.01) |
| *F16H 57/035* | (2012.01) |
| *F16H 9/00* | (2006.01) |
| *F16H 57/021* | (2012.01) |

(Continued)

(52) U.S. Cl.
CPC .................. *F02C 7/36* (2013.01); *F02C 7/06* (2013.01); *F16H 57/0025* (2013.01); *F16H 57/035* (2013.01); *F05D 2220/323* (2013.01); *F05D 2240/50* (2013.01); *F05D 2240/60* (2013.01); *F16H 7/00* (2013.01); *F16H 9/00* (2013.01); *F16H 2003/0826* (2013.01); *F16H 2057/0213* (2013.01)

(58) Field of Classification Search
CPC ........ F02C 7/36; F02C 7/06; F05D 2220/323; F05D 2240/50; F05D 2240/60
USPC ....................................... 415/122.1
See application file for complete search history.

(56) References Cited

U.S. PATENT DOCUMENTS

| | | | |
|---|---|---|---|
| 8,858,388 B2 | 10/2014 | McCune et al. | |
| 2007/0225111 A1* | 9/2007 | Duong ...................... | F16D 3/72 475/331 |

(Continued)

FOREIGN PATENT DOCUMENTS

EP    3306116 A1    4/2018

OTHER PUBLICATIONS

German Search Report dated Aug. 21, 2019 from counterpart German Patent Application No. 10 2018 132 675.0.

*Primary Examiner* — Yi-Kai Wang
(74) *Attorney, Agent, or Firm* — Shuttleworth & Ingersoll, PLC; Timothy Klima

(57) ABSTRACT

A gas turbine engine for an aircraft, including the following: a core engine including a turbine, a compressor, and a core shaft connecting the turbine to the compressor;
a fan, which is positioned upstream of the core engine, wherein the fan includes a plurality of fan blades; and
a gear box which can be driven by the core shaft, wherein the fan can be driven at a lower rotational speed than the core shaft by means of the gear box, wherein
the core shaft is designed as a drive shaft for the gear box and has at least one axial first region which has a diameter greater than the diameter of at least one axial second region, wherein the at least one first region is arranged axially between the drive side of the gear box and a mounting and/or attachment on a static part of the gas turbine engine.

15 Claims, 3 Drawing Sheets

(51) Int. Cl.
*F16H 7/00* (2006.01)
*F16H 3/08* (2006.01)

(56) References Cited

U.S. PATENT DOCUMENTS

2011/0130246 A1* 6/2011 McCune ............... F01D 25/164
477/115
2015/0176493 A1 6/2015 Munsell et al.
2016/0032773 A1* 2/2016 James ................... F01D 25/20
416/170 R

* cited by examiner

GAS TURBINE ENGINE

This application claims priority to German Patent Application DE102018132675.0 filed Dec. 18, 2018, the entirety of which is incorporated by reference herein.

The present disclosure relates to a gas turbine engine having features as disclosed herein.

In gas turbine engines, in particular in geared fan engines of aircraft, epicyclic gear boxes (planetary gear boxes) are used to reduce the relatively high speeds of a turbine for the purposes of driving a fan of the engine. The attachment of the drive shaft to the gear box is subjected to particular loads. A drive shaft is known for example from EP 3 306 116 A1.

It is therefore the object to provide correspondingly adapted gas turbine engines.

This object is achieved by a gas turbine engine having features as disclosed herein.

Here, the gas turbine engine comprises a core engine with a turbine, a compressor, and a core shaft connecting the turbine to the compressor. Furthermore, the gas turbine engine has a fan which is positioned upstream of the core engine, wherein the fan comprises a plurality of fan blades. A gear box can be driven by the core shaft, wherein the fan can be driven at a lower rotational speed than the core shaft by means of the gear box. This means that the rotational speed of the fan is lower than the rotational speed of the driving turbine.

The core shaft is designed as a drive shaft for the gear box and has at least one axial first region which has a diameter greater than the diameter of at least one axial second region, wherein the at least one first region is arranged axially between the drive side of the gear box and a mounting and/or attachment on a static part of the gas turbine engine.

The core shaft thus has a targeted widening, that is to say enlargement of the diameter. It is thereby possible for the wall thickness of the core shaft to be adapted in the different regions, in order to obtain for example a particularly flexurally elastic core shaft arrangement.

Here, the core shaft may have exactly one first region, that is to say exactly one region in which the diameter has been enlarged in targeted fashion. It is thus possible in particular for almost the entire region between drive side of the gear box and the static attachment to be configured as first region with an enlarged diameter.

Alternatively, the core shaft may have a multiplicity of regions with different diameters. This may be advantageous in particular in the case of relatively complex installation spaces in the core engine.

It is also possible for the diameter of the at least one first region to be constant or to vary within the region. The at least one region could thus for example be of conical form.

The mounting and/or attachment on the static part may be arranged axially in the region of the low-pressure compressor of the gas turbine engine. The mounting and/or attachment on the static part may thus be arranged in the region of a hub (bearing hub). The mounting and/or the attachment on the static part may also have at least one rolling bearing, in particular a roller bearing. The static part may for example be designed as a part of a casing for the gear box and/or as a part of the core engine.

In one embodiment, in a manner adapted to the available structural space, the diameter of the core shaft at the connection of the core shaft to the gear box may be smaller than the diameter of the second region, that is to say, in this way, said diameter is also smaller than that of the first region.

Between the regions with different diameters, there are situated transition regions, which may basically have a radial extent. Here, at least one transition region between the regions with different diameters may be formed by a radially perpendicular shaft part. Here, perpendicular steps are formed in the core shaft. At least one transition region between the regions with different diameters may be formed by a shaft part which is inclined relative to the main axis of rotation by 1 to 15°, that is to say the shoulder between the regions is slightly inclined. It is basically also possible for differently shaped transition regions to be used in one core shaft.

In a further embodiment, the axial extent of the at least one first region amounts to more than 50%, in particular more than 80%, of the axial extent of the core shaft between the gear box and the mounting and/or attachment on the static part. A major part of the core shaft in the direction of the gear box is thus widened.

Also, the wall thickness of the core shaft may be thinner in the at least one first region than in at least one other region of the core shaft, in particular thinner than in the at least one second region of the core shaft. The greater the extent to which the core shaft is widened, the thinner the wall thickness can be made. For example, the wall thickness of the first region may be smaller at least by a factor of 1.5, in particular by a factor of 2, than the wall thickness in another region of the core shaft, in particular than in the at least one second region.

Furthermore, in one embodiment, the ratio of the wall thickness of the first region to the axial length of the first region lies in the range between 0.02 and 0.08. In addition or alternatively, the ratio of the wall thickness of the second region to the axial length of the second region may lie in the range between 0.05 and 0.1.

As noted elsewhere herein, the present disclosure may relate to a gas turbine engine, for example an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be advantageous in particular, but not exclusively, for geared fans, which are driven via a gear box. Accordingly, the gas turbine engine may comprise a gear box which is driven via the core shaft and the output of which drives the fan in such a way that it has a lower rotational speed than the core shaft. The input to the gear box may be effected directly from the core shaft, or indirectly via the core shaft, for example via a spur shaft and/or a spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher speed than the first core shaft.

In such an arrangement, the second compressor may be positioned axially downstream of the first compressor. The second compressor may be arranged to receive (for example directly receive, for example via a generally annular duct) a flow from the first compressor.

The gear box may be designed to be driven by the core shaft that is configured to rotate (for example during use) at the lowest rotational speed (for example the first core shaft in the example above). For example, the gear box may be designed to be driven only by the core shaft that is configured to rotate (for example during use) at the lowest rotational speed (for example only by the first core shaft and not the second core shaft, in the example above). Alternatively, the gear box may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, if a second compressor is provided. By way of a further example, the flow at the exit of the compressor may be supplied to the inlet of the second turbine, if a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of incidence may be variable). The row of rotor blades and the row of stator blades may be axially offset with respect to one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to one another.

Each fan blade may have a radial span extending from a root (or a hub) at a radially inner location which is flowed over by gas, or from a position of 0% span, to a tip with a 100% span. The ratio of the radius of the fan blade at the hub to the radius of the fan blade at the tip may be less than (or of the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by any two values in the previous sentence (i.e. the values may form upper or lower bounds). These ratios may be referred to in general as the hub-to-tip ratio. The radius at the hub and the radius at the tip may both be measured at the leading edge (or the axially forwardmost edge) of the blade. The hub-to-tip ratio refers, of course, to that portion of the fan blade which is flowed over by gas, i.e. the portion radially outside any platform.

The radius of the fan may be measured between the engine centerline and the tip of the fan blade at its leading edge. The diameter of the fan (which can generally be double the radius of the fan) can be larger than (or of the order of): 250 cm (approximately 100 inches), 260 cm (approximately 102 inches), 270 cm (approximately 105 inches), 280 cm (approximately 110 inches), 290 cm (approximately 115 inches), 300 cm (approximately 120 inches), 310 cm (approximately 122 inches), 320 cm (approximately 125 inches), 330 cm (approximately 130 inches), 340 cm (approximately 135 inches), 350 cm (approximately 138 inches), 360 cm (approximately 140 inches), 370 cm (approximately 145 inches), 380 cm (approximately 150 inches) or 390 cm (approximately 155 inches). The fan diameter may be in an inclusive range bounded by any two of the values in the previous sentence (i.e. the values may form upper or lower bounds).

The speed of the fan may vary in operation. Generally, the speed is lower for fans with a larger diameter. Purely by way of a non-limiting example, the rotational speed of the fan under cruise conditions may be less than 2500 rpm, for example less than 2300 rpm. Purely as a further non-limiting example, the rotational speed of the fan under cruise conditions for an engine having a fan diameter in the range of from 250 cm to 300 cm (for example 250 cm to 280 cm) may also be in the range of from 1700 rpm to 2500 rpm, for example in the range of from 1800 rpm to 2300 rpm, for example in the range of from 1900 rpm to 2100 rpm. Purely as a further non-limiting example, the speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $J\,kg^{-1}\,K^{-1}/(ms^{-1})^2$). The fan tip loading may be in an inclusive range bounded by any two of the values in the previous sentence (i.e. the values may form upper or lower bounds).

Gas turbine engines according to the present disclosure can have any desired bypass ratio, wherein the bypass ratio is defined as the ratio of the mass flow rate of the flow through the bypass duct to the mass flow rate of the flow through the core under cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by an engine nacelle and/or a fan casing.

The overall pressure ratio of a gas turbine engine as described and/or claimed herein may be defined as the ratio of the stagnation pressure upstream of the fan to the stagnation pressure at the exit of the highest pressure compressor (before entry into the combustor). As a non-limiting example, the overall pressure ratio of a gas turbine engine as described and/or claimed herein at cruising speed may be greater than (or of the order of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein at cruise conditions may be less than (or of the order of): 110 N kg$^{-1}$ s, 105 N kg$^{-1}$ s, 100 N kg$^{-1}$ s, 95 N kg$^{-1}$ s, 90 N kg$^{-1}$ s, 85 N kg$^{-1}$ s or 80 N kg$^{-1}$ s. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely as a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust under standard atmospheric conditions at sea level plus 15° C. (ambient pressure 101.3 kPa, temperature 30° C.), with the engine static.

In use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At cruising speed, the TET may be at least (or of the order of): 1400 K, 1450 K, 1500 K, 1550 K, 1600 K or 1650 K. The TET at cruising speed may be in an inclusive range bounded by any two of the values in the previous sentence (i.e. the values may form upper or lower bounds). The maximum TET during the use of the engine may for example be at least (or of the order of): 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET can occur, for example, under a high thrust condition, for example under a maximum take-off thrust (MTO) condition.

A fan blade and/or airfoil portion of a fan blade described and/or claimed herein may be produced from any suitable material or combination of materials. For example, at least a part of the fan blade and/or airfoil may be produced at least in part from a composite, for example a metal matrix composite and/or an organic matrix composite, such as carbon fiber. As a further example, at least a part of the fan blade and/or airfoil may be produced at least in part from a metal, such as a titanium-based metal or an aluminum-based material (such as an aluminum-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely as an example, the fan blade may have a carbon-fiber-based or aluminum-based body (such as an aluminum-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage with a corresponding slot in the hub (or disk). Purely as an example, such a fixture may be in the form of a dovetail that may slot into and/or be brought into engagement with a corresponding slot in the hub/disk in order to fix the fan blade to the hub/disk. As a further example, the fan blades may be formed integrally with a central portion. Such an arrangement can be referred to as a blisk or a bling. Any suitable method may be used to manufacture such a blisk or such a bling. For example, at least a part of the fan blades may be machined from a block and/or at least a part of the fan blades may be attached to the hub/disk by welding, such as linear friction welding.

The gas turbine engines described and/or claimed herein may or may not be provided with a variable area nozzle (VAN). Such a variable area nozzle may allow the exit area of the bypass duct to be varied during operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions may be conventionally defined as the conditions during the middle part of the flight, for example the conditions experienced by the aircraft and/or the engine between (in terms of time and/or distance) the end of the ascent and the start of the descent.

Purely as an example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any speed within these ranges may be the cruise condition. For some aircraft, the cruise condition may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example of the order of 11000 m. The cruise conditions may correspond to standard atmospheric conditions at any given altitude in these ranges.

Purely by way of example, the cruise conditions may correspond to the following: a forward Mach number of 0.8, a pressure of 23000 Pa and a temperature of −55° C.

As used anywhere herein, "cruise" or "cruise conditions" can mean the aerodynamic design point. Such an aerodynamic design point (or ADP) may correspond to the conditions (comprising, for example, the Mach Number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the cruise conditions defined elsewhere herein. Such cruise conditions may be determined by the cruise conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described in relation to any one of the above aspects may be applied to any other aspect, unless they are mutually exclusive. Furthermore, any feature or any parameter described here may be applied to any aspect and/or combined with any other feature or parameter described here, unless they are mutually exclusive.

Embodiments will now be described by way of example with reference to the figures, in which.

Figure 1:
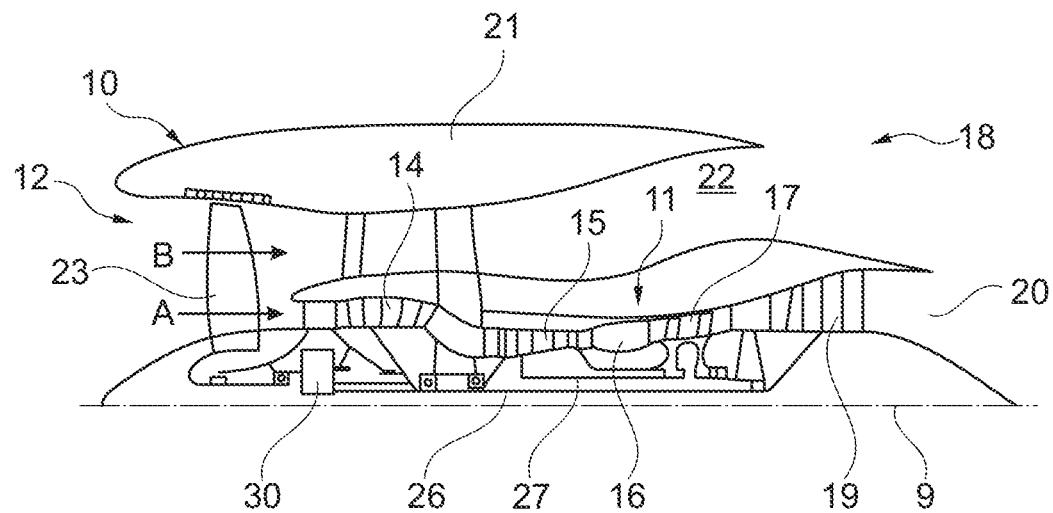
FIG. 1 shows a sectional lateral view of a gas turbine engine.

FIG. 1 illustrates a gas turbine engine 10 having a main axis of rotation 9. The gas turbine engine 10 comprises an air inlet 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary gear box 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by means of a suitable connection shaft 27. The fan 23 generally provides the major part of the propulsive thrust. The epicyclic planetary gear box 30 is a reduction gear box.

Figure 2:
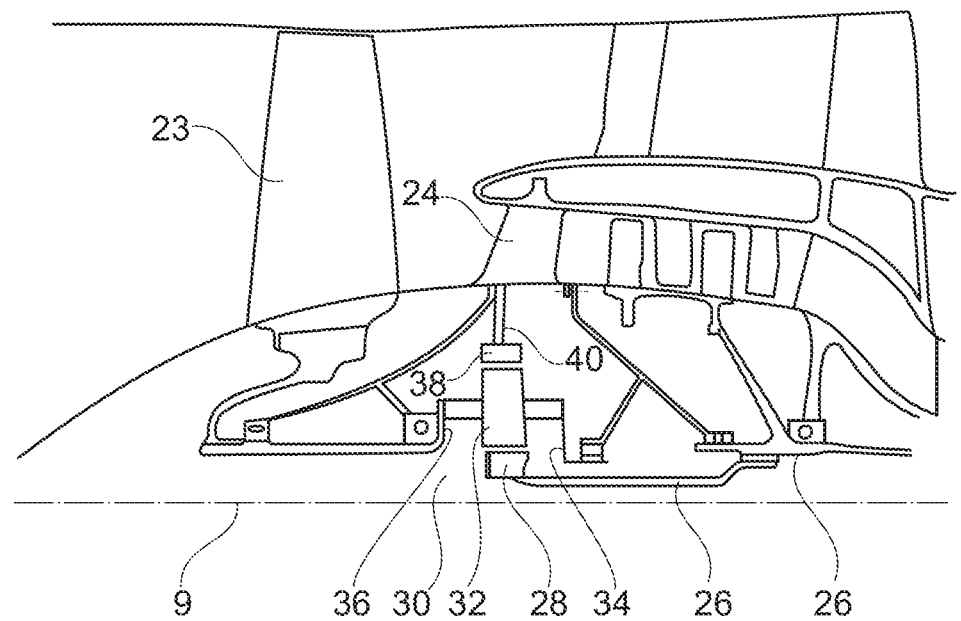
FIG. 2 shows a close-up sectional lateral view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic planetary gear box 30. Radially to the outside of the sun gear 28 and meshing therewith are a plurality of planet gears 32 that are coupled to one another by a planet carrier 34. The planet carrier 34 guides the planet gears 32 in such a way that they circulate synchronously around the sun gear 28, whilst enabling each planet gear 32 to rotate about its own axis. The planet carrier 34 is coupled via linkages 36 to the fan 23 in order to drive its rotation about the engine axis 9. Radially to the outside of the planet gears 32 and meshing therewith is an annulus or ring gear 38 that is coupled, via linkages 40, to a stationary supporting structure 24.

Note that the terms "low-pressure turbine" and "low-pressure compressor" as used herein may be taken to mean the lowest-pressure turbine stage and lowest-pressure compressor stage (i.e. not including the fan 23) respectively and/or the turbine and compressor stages that are connected together by the connecting shaft 26 with the lowest rotational speed in the engine (i.e. not including the gear-box output shaft that drives the fan 23). In some literature, the "low-pressure turbine" and "low-pressure compressor" referred to herein may alternatively be known as the "intermediate-pressure turbine" and "intermediate-pressure compressor". Where such alternative nomenclature is used, the fan 23 can be referred to as a first, or lowest-pressure, compression stage.

Figure 3:
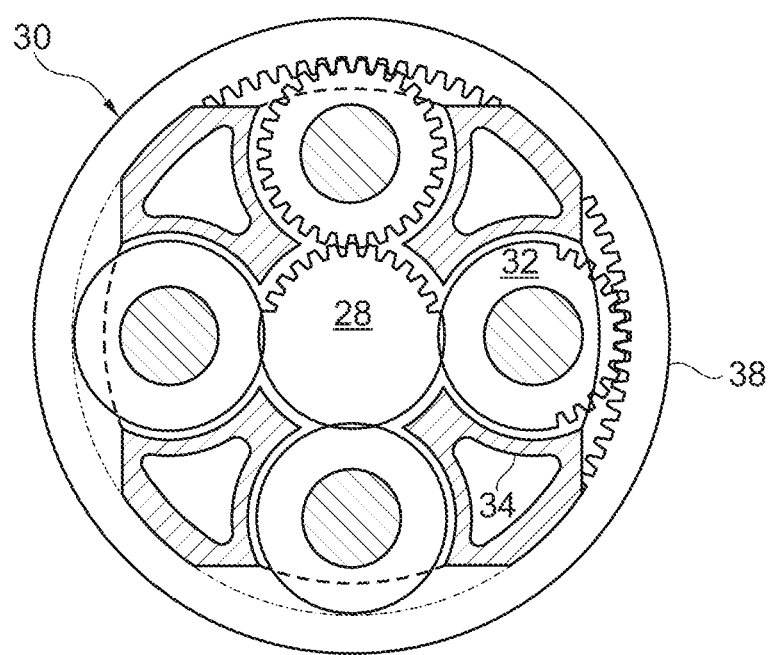
FIG. 3 shows a partially cut-away view of a gear box for a gas turbine engine.

The epicyclic planetary gear box 30 is shown by way of example in greater detail in FIG. 3. The sun gear 28, planet gears 32 and ring gear 38 in each case comprise teeth on their periphery to allow intermeshing with the other gearwheels. However, for clarity, only exemplary portions of the teeth are illustrated in FIG. 3. Although four planet gears 32 are illustrated, it will be apparent to a person skilled in the art that more or fewer planet gears 32 can be provided within the scope of protection of the claimed invention. Practical applications of an epicyclic planetary gear box 30 generally comprise at least three planet gears 32.

The epicyclic planetary gear box 30 illustrated by way of example in FIGS. 2 and 3 is a planetary gear box in which the planet carrier 34 is coupled to an output shaft via linkages 36, with the ring gear 38 being fixed. However, any other suitable type of planetary gear box 30 may be used. As a further example, the planetary gear box 30 may be a star arrangement, in which the planet carrier 34 is held fixed, with the ring gear (or annulus) 38 allowed to rotate. In such an arrangement, the fan 23 is driven by the ring gear 38. As a further alternative example, the gear box 30 can be a differential gear box in which the ring gear 38 and the planet carrier 34 are both allowed to rotate.

It is self-evident that the arrangement shown in FIGS. 2 and 3 is merely an example, and various alternatives fall within the scope of protection of the present disclosure. Purely by way of example, any suitable arrangement may be used for locating the gear box 30 in the gas turbine engine 10 and/or for connecting the gear box 30 to the gas turbine engine 10. As a further example, the connections (for example the linkages 36, 40 in the example of FIG. 2) between the gear box 30 and other parts of the gas turbine engine 10 (such as the input shaft 26, the output shaft and the fixed structure 24) may have a certain degree of stiffness or flexibility. As a further example, any suitable arrangement of the bearings between rotating and stationary parts of the gas turbine engine 10 (for example between the input and output shafts of the gear box and the fixed structures, such as the gear-box casing) may be used, and the disclosure is not limited to the exemplary arrangement of FIG. 2. For example, where the gear box 30 has a star arrangement (described above), a person skilled in the art would readily understand that the arrangement of output and supporting linkages and bearing positions would usually be different than that shown by way of example in FIG. 2.

Accordingly, the present disclosure extends to a gas turbine engine having any arrangement of types of gear box (for example star or epicyclic-planetary), supporting structures, input and output shaft arrangement, and bearing locations.

Optionally, the gear box may drive additional and/or alternative components (for example the intermediate-pressure compressor and/or a booster compressor).

Other gas turbine engines to which the present disclosure can be applied may have alternative configurations. For example, such engines may have an alternative number of compressors and/or turbines and/or an alternative number of connecting shafts. As a further example, the gas turbine engine shown in FIG. 1 has a split flow nozzle 20, 22, meaning that the flow through the bypass duct 22 has its own nozzle that is separate from and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the example described relates to a turbofan engine, the disclosure may be applied, for example, to any type of gas turbine engine, such as an open-rotor engine (in which the fan stage is not surrounded by an engine nacelle) or a turboprop engine. In some arrangements, the gas turbine engine 10 may not comprise a gear box 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

Figure 4:
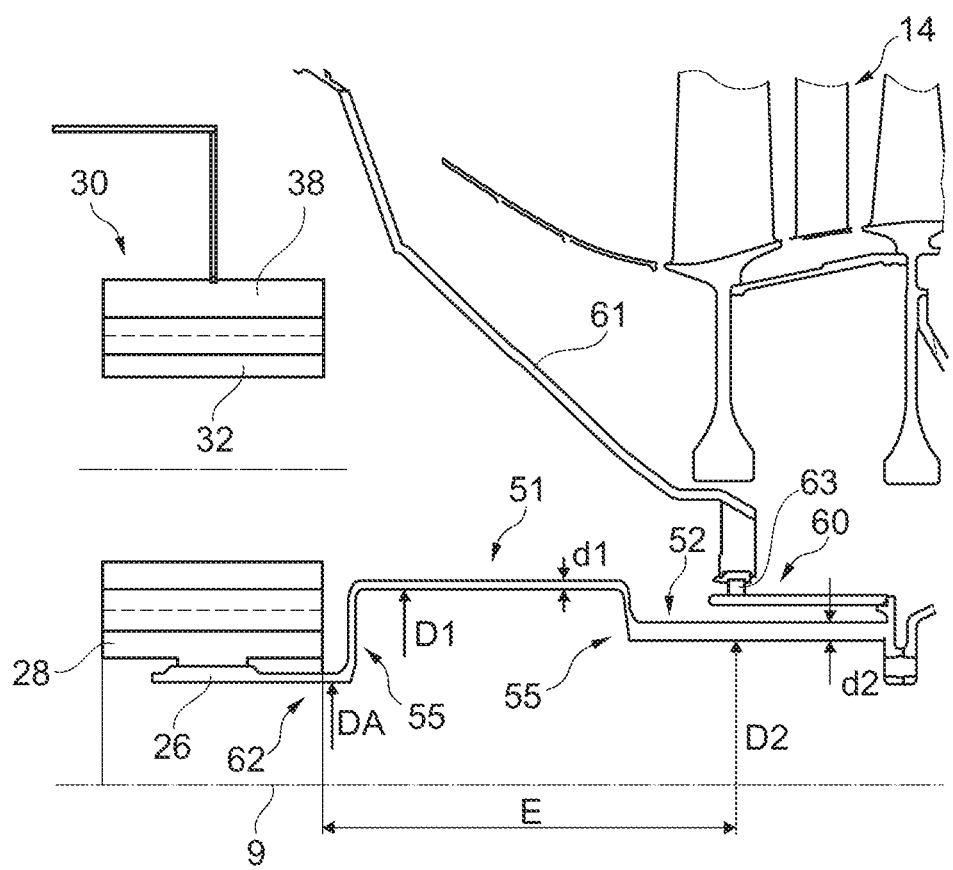
FIG. 4 shows a sectional view through a part of an embodiment of a core shaft.

FIG. 4 illustrates a part of a gas turbine engine 10 with a gear box 30. Primarily the region of the core shaft 26 as drive shaft for the gear box 30 is illustrated here.

In an axial extent, primarily the region 62 between the connection of the core shaft 26 to the gear box 30 and an attachment 60 of the core shaft 26 to a static part 61 of the gas turbine engine 10 is illustrated, that is to say that region of the core shaft 26 which extends into the region of the low-pressure compressor 14. Here, a roller bearing 63 is arranged in the region of the attachment to the static part 61.

Here, along the axial extent, the core shaft 26 has regions 51, 52, 62 with different diameters D1, D2, DA.

An axially first region 51 has a diameter D1, which is greater than the diameter D2 of an axial second region 52, wherein the first region 51 is arranged axially between the drive side of the gear box 30 and the mounting and/or attachment 60 on the static part 61. The first region 51 also has a greater diameter D1 than the connecting region 62 of core shaft 26 and gear box 30. The diameter DA there is even smaller than the diameter D2 of the second region 52. Here, the diameter D1 is constant in the axial extent. In an alternative embodiment, the diameter D1 may vary in the axial direction, for example by assuming a conical shape.

The axial extent of the first region 51 amounts to more than 50%, in the present case approximately 66%, of the axial extent E between the gear box 30 and the mounting and/or attachment 60 on the static part 61.

The first region 51 is thus situated in a region of the gear-box casing, of which the static part 61 is a constituent part, in which there is more structural space in a radial direction than, for example, further rearward in the gas turbine engine 10, for example in the region of the low-pressure compressor 14.

The enlargement of the diameter D1 of the first region 51 in relation to the second region 52 permits a reduction of the wall thickness d1 in the first region 51 in relation to other points of the core shaft 26, for example the wall thickness d2 in the second region 52. Weight can be saved by means of the reduction of the wall thickness. Additionally, the enlargement of the diameter in the first region makes it possible to realize a more flexible shaft, which is advantageous for this application. An efficient decoupling of the fan gear box 30 from possible loads of the compressors 14 positioned downstream can thus be realized.

In the embodiment illustrated, the wall thickness d1 of the first region 51 is twice as great as the wall thickness of the second region 52.

The ratio of the wall thickness d1 of the first region 51 to the axial extent of the first region 51 amounts to 0.03 in the embodiment illustrated.

The ratio of the wall thickness d2 of the first region 52 to the axial extent of the second region 52 amounts to 0.07 in the embodiment illustrated.

These dimensional specifications may be deviated from in alternative embodiments.

Between the axial regions 51, 52, 62, there are transition regions 55 in which the core shaft 26 forms radial transitions. These transition regions 55 may be formed perpendicularly to the main axis of rotation 9 or, as in the embodiment illustrated, so as to be inclined (relative to the main axis of rotation 9). The inclination may for example lie in the range between 1 and 15°.

It will be understood that the invention is not limited to the embodiments described above, and various modifications and improvements may be made without departing from the concepts described herein. Except where mutually exclusive, any of the features may be used separately or in combination with any other features, and the disclosure extends to and includes all combinations and sub-combinations of one or more features that are described herein.

LIST OF REFERENCE SIGNS

9 Main axis of rotation
10 Gas turbine engine
11 Core engine
12 Air intake
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary supporting structure
26 Shaft, drive shaft
27 Connection shaft
28 Sun gear
30 Gear box
32 Planet gears
34 Planet carrier
36 Linkage
38 Ring gear
40 Linkage
51 First region of the core shaft
51 Second region of the core shaft
55 Transition region between parts of the core shaft
60 Attachment/mounting of the core shaft relative to static part
61 Static part in the gas turbine engine
62 Core shaft—gear box connection
63 Roller bearing
DA Diameter of the core shaft at the attachment to the gear box
D1 Diameter of the first region of the core shaft
d1 Wall thickness of the first region D2 Diameter of the second region of the core shaft
d2 Wall thickness of the second region
E Length of the core shaft between gear box and static attachment

The invention claimed is:

1. A gas turbine engine for an aircraft, comprising:
a core engine comprising a turbine, a compressor, and a core shaft connecting the turbine to the compressor;
a fan, which is positioned upstream of the core engine, wherein the fan includes a plurality of fan blades;
a gear box between the core engine and the fan, wherein the gear box is driven by the core shaft, and wherein the fan is driven at a lower rotational speed than the core shaft via the gear box;
a static part of the gas turbine engine including a rotational mounting of the core shaft, wherein the core shaft includes a length between a drive side of the gear box and an axial position of the rotational mounting of the core shaft;
wherein the core shaft includes an axial first region and an axial second region, wherein the axial first region is arranged between the drive side of the gear box and the axial position of the rotational mounting of the core shaft, and wherein the axial first region includes an axial first region length which is greater than 50% of the length between the drive side of the gear box and the axial position of the rotational mounting of the core shaft; and
wherein, spanning the axial first region length, the axial first region of the core shaft includes a diameter greater than a diameter of the axial second region, resulting in an axial majority of the core shaft which is widened toward the drive side of the gear box.

2. The gas turbine engine according to claim 1, wherein the core shaft includes exactly one axial first region.

3. The gas turbine engine according to claim 1, wherein the core shaft includes a plurality of regions with different diameters.

4. The gas turbine engine according to claim 1, wherein the diameter of the axial first region is one chosen from constant and varying within the axial first region.

5. The gas turbine engine according to claim 1, wherein the rotational mounting of the core shaft on the static part is arranged axially in a region of the compressor.

6. The gas turbine engine according to claim 1, wherein the rotational mounting of the core shaft on the static part is arranged in a region of a hub.

7. The gas turbine engine according to claim 1, wherein the rotational mounting of the core shaft on the static part includes at least one rolling bearing.

8. The gas turbine engine according to claim 6, wherein the static part is a part of at least one chosen from a casing for the gear box and the core engine.

9. The gas turbine engine according to claim 1, wherein a diameter of the core shaft at a connection of the core shaft to the gear box is smaller than a diameter of the axial second region.

10. The gas turbine engine according to claim 1, including at least one transition region between the axial first region and the axial second region and wherein the at least one transition region is a radially perpendicular shaft part.

11. The gas turbine engine according to claim 1, including at least one transition region between the axial first region and the axial second region and wherein the at least one transition region is a shaft part which is inclined relative to a main axis of rotation by 1 to 15°.

12. The gas turbine engine according to claim 1, wherein a wall thickness of the core shaft in the axial first region is thinner than a wall thickness in the axial second region of the core shaft.

13. The gas turbine engine according to claim 12, wherein the wall thickness of the axial first region is thinner at least by a factor of 1.5 than the wall thickness in the axial second region.

14. The gas turbine engine according to claim 12, wherein a ratio of the wall thickness of the axial first region to an axial length of the axial first region is between 0.02 and 0.08.

15. The gas turbine engine according to claim 12, wherein a ratio of the wall thickness of the axial second region to an axial length of the axial second region is between 0.05 and 0.1.

* * * * *